Jan. 16, 1940.　　　　K. R. LARSON　　　　2,187,609
FISH LURE
Filed Sept. 16, 1938
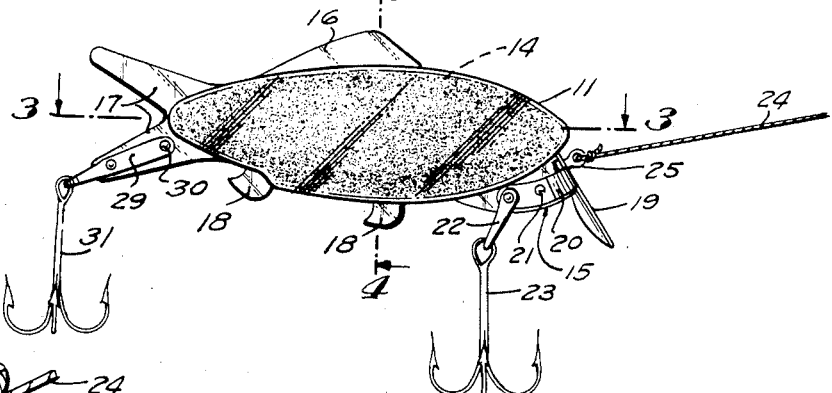
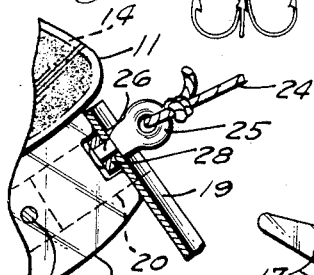
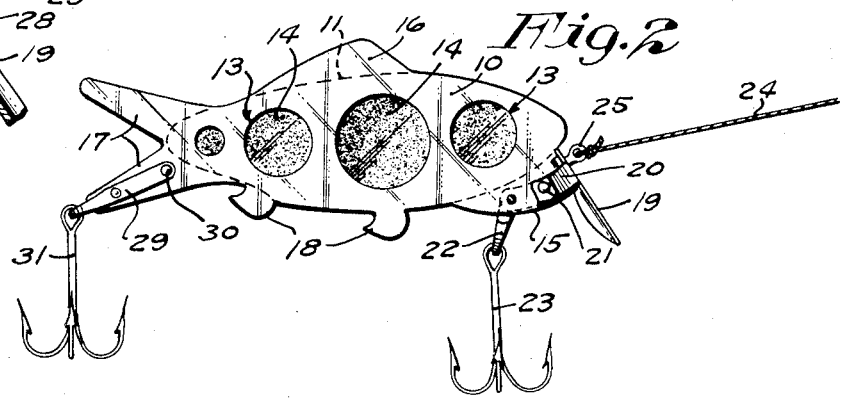
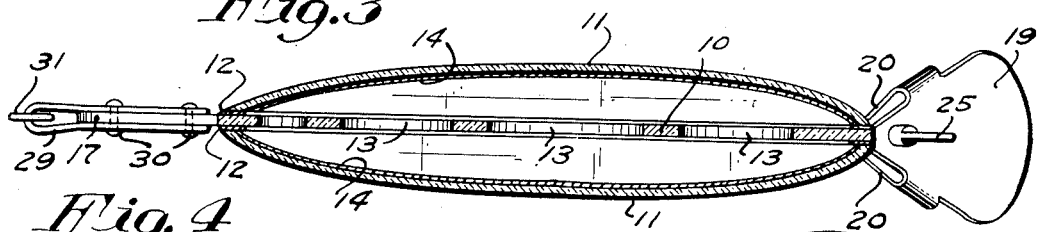
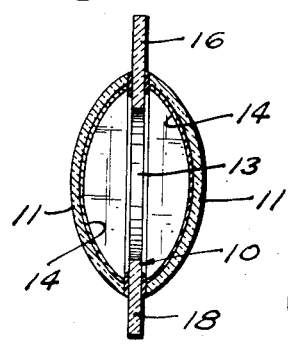
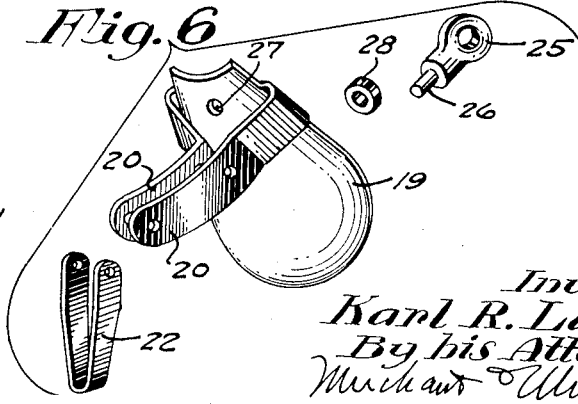
Inventor
Karl R. Larson
By his Attorneys Patented Jan. 16, 1940

2,187,609

UNITED STATES PATENT OFFICE 2,187,609

FISH LURE

Karl R. Larson, Minneapolis, Minn.

Application September 16, 1938, Serial No. 230,255

7 Claims. (Cl. 43—46)

My present invention provides an extremely simple and highly efficient fish lure or bait preferably made in close imitation of a fish. Generally stated, the invention consists of novel devices, combinations of devices and arrangement of parts hereinafter described and defined in the claims.

The lure, or rather the body thereof, is made up of three main elements, to wit, a flat center board or plate and a pair of concavo-convex reversely bulged side plates or shells that form the body of the lure. These elements are made of light material that is insoluble in water and are transparent or translucent, such as Celluloid or Bakelite. These three elements are assembled and combined with other important novel features all of which are illustrated in the accompanying drawing wherein like characters indicate like parts throughout the several views.

Referring to the drawing:

Fig. 1 is a side elevation showing the complete lure or bait made in close imitation of small fish;

Fig. 2 is a view corresponding to Fig. 1 but with one of the side plates or shells removed;

Fig. 3 is a horizontal section taken on the line 3—3 of Fig. 1 showing the lure on a larger scale than in Figs. 1 and 2;

Fig. 4 is a transverse section taken on the line 4—4 of Fig. 1;

Fig. 5 is a side elevation with some sections showing the front portion of the lure or bait; and Fig. 6 is a perspective showing the spoon of the bait and cooperating attaching elements with the portions thereof separated or drawn apart.

The center plate 10, as stated, is a flat plate, while the side plates 11 are concavo-convex and reversely bulged. The side plates 11 at their edges are cut off parallel to the face of the center plate 10 and are directly secured thereto by cement or adhesive material or by welding, indicated at 12. The side plates 11 are impervious to water so that the interior of the lure will be kept free from water and filled with air so as to give the desired buoyancy to the bait. The plate 10, within the bait body, is formed with perforations or openings 13 that decrease the weight of the center plate to permit the free circulation of air within the bait body from one side to the other of the center plate.

The side plates or shells 11 may be of any color or tint and may be made more or less transparent. If tinted by the application of coloring material, it should be applied to the interior of the shells, as indicated at 14, so that the outer surfaces of the shells will be smooth and free from decorative markings that could be washed off or worn off from the exterior of the bait.

The center plate 10 is provided with edge portions that project beyond the side shells to afford anchors for hooks and for the application of a fish line, and to form fin portions. As best shown in Fig. 2, the projections of the center plate beyond the side shells are at 15, 16, 17 and 18. The projecting flange 15 affords an anchor for the attachment of a metallic spoon or deflecting plate 19. This spoon 19 is formed with integral strap-like arms 20 that are bent backward and pressed against the flange 15 and secured thereto by rivets 21 or the like. The rear rivets 21 also pivotally secure to the rear ends of the arms 20 and hence to the flange 15, a yoke-like hook anchor 22 that secures the fish hook 23 in a depending position below the bait.

The fish line 24 is shown attached to an eyelet 25, the reduced stem 26 of which is passed through a perforation 27 at the top of the spoon 19. The rear end of the stem 26 is passed through a washer 28 located at the back of the spoon, and said stem 26 is riveted or upset back of the washer 28 so that the eyelet is securely anchored to the upper portion of the spoon.

At the stem portion of its upper edge, the center plate is projected to form a fin corresponding to what is usually designated as the dorsal fin; at its rear end the center plate is projected to form upper and lower fins usually designated as the caudal or tail fins; and at the under edge of the bait, the center plate is projected to form what corresponds to fins usually designated as the ventral fins. A yoke-like metallic hook anchor 29 is rigidly secured to the fin portion 17 by rivets 30 or the like. This anchor 29 supports the rear hook 31 in proper position but with freedom for swinging movement.

In this device all of the strains or forces are taken by the center plate, and the side plates are relieved from all strains due to pull on the bait or on the line. The projecting portions of the center plate tend to keep the bait from rotating, while the spoon will cause the bait to wobble from side to side as it is drawn through the water.

The preferred form of the improved lure is illustrated in the drawing, but it will be understood that the same is capable of modification as to details of construction and arrangement of parts within the scope of the invention herein disclosed and claimed.

By reference particularly to Fig. 5 it will be noted that the spoon 19 is seated solidly against the front edge of the flange or projection 15 and by the riveted arms 20 it is firmly connected against lateral bending or swaying movements in respect to the center plate 10. In this way the line is securely connected to the front end of the center plate 10, and the hooks are anchored to the said center plate. Hence, the center plate should be quite strong while the side plates or shells 11 can be very light.

What I claim is:

1. A fish lure of the kind described comprising an upright center plate and reversely bulged side plates secured thereto with water-tight joints, said side plates being impervious to the passage of water and forming an air tight chamber within the lure body, said center plate having front and rear flanges projecting beyond the side plates, a depending spoon anchored to the front flange of said center plate, and a hook anchored to the rearwardly projecting flange of said center plate.

2. The structure defined in claim 1 in which there is a second hook anchored to a depending front flange of said center plate.

3. A fish lure of the kind described involving an upright center plate and reversely bulged side plates secured thereto, said center plate having front and rear projecting flanges, a spoon seated against the front flange of said center plate and having backwardly bent arms riveted to said flange, yoke-like hook anchors riveted to the front and rear flanges of said center plate, and depending hooks loosely held by said front and rear hook anchors.

4. The structure defined in claim 4 in which said center plate at is rear end is provided with diverging upper and lower flanges and in which said rear hook anchor is applied to the lower of said rear flanges.

5. The structure defined in claim 4 in which said center plate at its rear end is provided with diverging upper and lower flanges and in which said rear hook anchor is applied to the lower of said rear flanges, said center plate having upper and lower fin-forming flanges.

6. A fish lure of the kind described comprising an upright center plate and side plates secured thereto and outlining the body of the bait, said center plate having front and rear flanges projecting beyond the side plates, a depending spoon anchored to the projecting front flange of said center plate, and a hook anchored to the rearwardly projecting flange of said center plate.

7. A fish lure of the kind described comprising an upright center plate and reversely bulged side plates secured thereto with water-tight joints, said side plates being impervious to the passage of water and forming an air tight chamber within the lure body, and in which said center plate, within the air-tight chamber formed by said side plates, is perforated for the passage of air therethrough from one side to the other of said center plate.

KARL R. LARSON.